(12) United States Patent
Isaacson

(10) Patent No.: US 9,721,406 B2
(45) Date of Patent: Aug. 1, 2017

(54) SYSTEM AND METHOD FOR DOOR UNLOCKING USING A PAYMENT ACCOUNT

(71) Applicant: Thomas M. Isaacson, Huntingtown, MD (US)

(72) Inventor: Thomas M. Isaacson, Huntingtown, MD (US)

(*) Notice: Subject to any disclaimer, the term of this patent is extended or adjusted under 35 U.S.C. 154(b) by 73 days.

(21) Appl. No.: 14/681,188

(22) Filed: Apr. 8, 2015

(65) Prior Publication Data

US 2016/0300411 A1 Oct. 13, 2016

(51) Int. Cl.
| | | |
|---|---|---|
| G07C 9/00 | (2006.01) | |
| G07F 17/14 | (2006.01) | |
| G06Q 20/32 | (2012.01) | |
| G06Q 20/34 | (2012.01) | |

(52) U.S. Cl.
CPC ......... *G07C 9/00103* (2013.01); *G06Q 20/32* (2013.01); *G06Q 20/34* (2013.01); *G07C 9/00904* (2013.01); *G07F 17/14* (2013.01)

(58) Field of Classification Search
None
See application file for complete search history.

(56) References Cited

U.S. PATENT DOCUMENTS

| | | | | |
|---|---|---|---|---|
| 5,638,646 A * | 6/1997 | Shane | ...................... | E04H 1/125 235/382.5 |
| 5,979,754 A * | 11/1999 | Martin | ................ | G07C 9/00103 235/375 |
| 6,101,477 A * | 8/2000 | Hohle | .................... | G06Q 10/02 235/380 |
| 7,315,823 B2 * | 1/2008 | Brondrup | ............... | G06Q 10/02 705/5 |
| 7,973,640 B2 * | 7/2011 | Kawai | ................... | G06F 21/608 340/5.2 |
| 8,646,034 B2 * | 2/2014 | Murakami | ........... | G06F 9/4401 455/41.1 |
| 8,730,004 B2 * | 5/2014 | Elfstrom | ................ | G06Q 10/02 235/375 |
| 2003/0105643 A1 * | 6/2003 | Chen | ..................... | G06Q 10/02 358/1.15 |
| 2003/0158761 A1 * | 8/2003 | Johnston | ................ | G06Q 10/02 705/5 |
| 2008/0071587 A1 * | 3/2008 | Granucci | ............... | G06Q 10/02 705/5 |
| 2009/0157015 A1 * | 6/2009 | Lotterhos | ................ | G07F 13/00 604/289 |
| 2011/0187493 A1 * | 8/2011 | Elfstrom | ................ | G06Q 10/02 340/5.6 |

(Continued)

*Primary Examiner* — Curtis King
*Assistant Examiner* — Chico A Foxx

(57) ABSTRACT

Disclosed herein are systems, methods, and computer-readable storage media for door unlocking using a payment account. The system receives registration of a user at a business entity, such as a hotel and receives identification of a payment account associated with the user. Then the system establishes a policy such that the payment account is used as a key to unlock a door at the business entity, such as a hotel room. The system receives data associated with the payment account by receiving a card swipe at the hotel room door using a card associated with the payment account or via a wireless communication at the door. The door is unlocked based on validation of the data provided at the door.

20 Claims, 7 Drawing Sheets

(56) References Cited

U.S. PATENT DOCUMENTS

| | | | | |
|---|---|---|---|---|
| 2011/0302607 | A1* | 12/2011 | Warrick | H04L 12/2809 725/39 |
| 2012/0254030 | A1* | 10/2012 | Khan | H04L 63/0853 705/41 |
| 2013/0008958 | A1* | 1/2013 | Smith | G07C 9/00904 235/382 |
| 2013/0079951 | A1* | 3/2013 | Brickman | B60N 2/0244 701/2 |
| 2013/0248591 | A1* | 9/2013 | Look | G06K 19/06187 235/375 |
| 2014/0074536 | A1* | 3/2014 | Meushar | G06Q 10/1095 705/7.19 |
| 2014/0279244 | A1* | 9/2014 | Robinson | H04W 4/02 705/26.61 |
| 2014/0354214 | A1* | 12/2014 | Phelps | G07F 15/00 320/107 |
| 2015/0073959 | A1* | 3/2015 | Connors | G06Q 40/00 705/35 |
| 2015/0078137 | A1* | 3/2015 | Lee | G07C 9/00071 367/198 |
| 2015/0127712 | A1* | 5/2015 | Fadell | G06Q 10/083 709/202 |
| 2015/0206365 | A1* | 7/2015 | Wu | H04B 5/0031 340/5.61 |
| 2015/0235496 | A1* | 8/2015 | Vecchiotti | G07C 9/00309 340/5.61 |
| 2015/0348049 | A1* | 12/2015 | Todasco | G06Q 10/02 705/5 |
| 2016/0005248 | A1* | 1/2016 | Aase | G06F 21/34 340/5.61 |
| 2016/0055695 | A1* | 2/2016 | Saeedi | G07C 9/00087 340/5.52 |
| 2016/0188145 | A1* | 6/2016 | Vida | G06F 9/4443 715/745 |
| 2016/0217637 | A1* | 7/2016 | Gengler | G07C 9/00174 |

* cited by examiner

SYSTEM AND METHOD FOR DOOR UNLOCKING USING A PAYMENT ACCOUNT

BACKGROUND

1. Technical Field

The present disclosure relates to door unlocking and more specifically to using a payment account as a key to unlock a hotel room door.

2. Introduction

Hotels offer the comfort and convenience of home when traveling. During the check-in process at a hotel, a customer is given a room number and a physical key card to unlock a hotel room door. The hotel room door can only be unlocked using the key card given to the customer, or a master key card. Having a separate key card for unlocking a hotel room door adds bulk to a wallet when stored with other plastic cards and can be uncomfortable. Sometimes, customers forget to take a key card with them when leaving a hotel room, as the key card is not attached to a key ring as a traditional key typically is. As a result, customers become locked out of their hotel rooms and must notify hotel staff to gain re-entry.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for door unlocking using a payment account. A system implementing the method can receive registration of a user at a business entity, such as a hotel. The system can receive identification of a payment account associated with the user registered at the business entity, such as a VISA payment account and can establish a policy such that the payment account is used as a key to unlock a door at the business entity. In one aspect, a group of payment accounts are registered and any account in the group of payment accounts can unlock a specific door at the entity. The system can receive data associated with the payment account and can unlock the door at the business entity based on the data. Receiving data associated with the payment account can be accomplished by receiving a card swipe at the door using a card associated with the payment account, or via a wireless communication at the door. The payment account registered with the business entity can serve as a key to other doors at the business entity such as a conference center, hospitality room and fitness center, for example.

The system can transmit, to a server from a door mechanism, payment account data associated with a card swipe at a door. The system can validate the payment account data using a payment account database, at the server. The system can receive at the door mechanism, from the server, validation of the payment account data and can unlock the door based on the validation. If the system cannot validate the payment account, the door is not unlocked.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1:
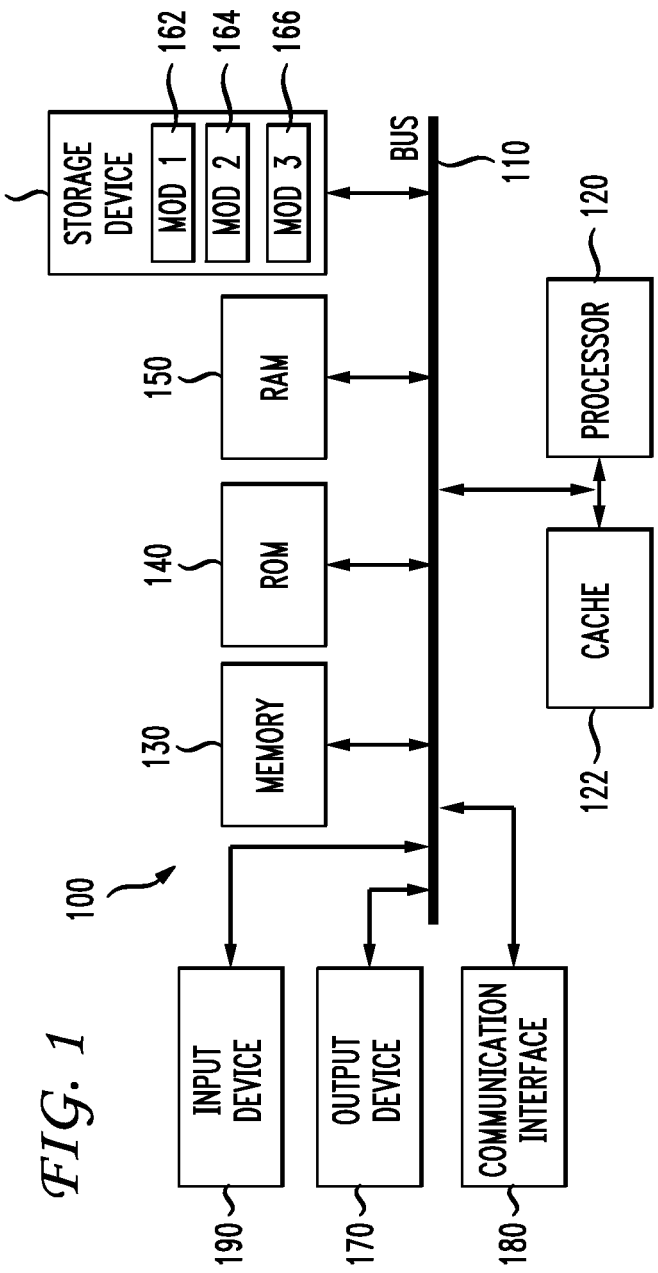
FIG. 1 illustrates an example system embodiment.

A system, method and computer-readable media are disclosed which unlock a door using a payment account at a business entity. As an example, consider a system that enables a user Robert to check into a hotel, such as the Marriott in San Diego, for one week to attend a conference held at the hotel. During the check-in process at the front desk of the hotel, the system can receive Robert's registration. During this process, the system receives identification of a payment account, such as a VISA credit account, associated with Robert and stores the payment account data in a database. Other examples of payment accounts are bank accounts and online payment accounts such as PayPal, Amazon and Apple Pay. The system establishes a policy such that the payment account (in this example the VISA credit account) is used as a key to unlock Robert's hotel room door at the Marriott. In one aspect, the policy allows for more than one payment account or identification card to be used as keys in unlocking Robert's hotel room door. For example, Robert can register both his driver's license and his VISA credit card with the hotel such that either of these cards will unlock his hotel room door. The policy allows for more than one door at the business entity to be opened using a payment account associated with a user. Examples of other doors at the hotel include: the front door after hours, a fitness center door, a hospitality room door, a pool door and a conference room door. In another aspect, the policy allows for a group of payment accounts to be associated with one or more users. For example, during the registration process Robert can register a joint credit card payment account held with his wife and his identification card to open doors at the hotel during his stay because his wife will join him for the last two days of the conference. Robert's wife will not have to go through the registration process because she already holds a card associated with a payment account used to unlock Robert's hotel room door. Robert can choose to unlock his door with either the card associated with the joint credit card or his identification card because he registered both cards with the system.

This process differs from the traditional method of issuing separate key cards to hotel patrons to use when unlocking hotel room doors. Robert uses a card associated with the payment account, his VISA credit card, to open his hotel room door instead of a separate key card issued by the hotel. The system receives data associated with the VISA payment account when Robert swipes his VISA card at the hotel room door mechanism and the system unlocks the hotel room door based on validation of the data.

The system can transmit to a server, from the door mechanism, Robert's payment account data associated with the card swipe at the hotel room door. The server can validate the payment account data using a payment account database and can transmit to the door mechanism, validation of the payment account. The system can receive, from the server at the door mechanism, validation of the payment account data and can unlock the door based on the validation. If the server cannot validate the payment account associated with the card swipe at the hotel room door, the door is not unlocked.

In one aspect, the door mechanism can receive data associated with the payment account via a wireless communication at the door. For example, instead of swiping his VISA credit card at the door, Robert uses a touch screen at the door to enter in his payment account information, and the system unlocks the door based on validation of the payment account information. In another example, Robert uses his smartphone within a certain proximity of the hotel room door to enter in his payment account information, and based on validation of the payment account information, the system wirelessly issues a door unlock command to allow Robert entry to the hotel room. A location-based service, such as GPS, can determine a users' location and the system can determine if he is within an allowable distance of the door to unlock it.

Additionally, an application or app, downloaded to a mobile device can be associated with the policy. The system can provide, via the app, a notification to the user based on a time of unlocking a door at the business entity and the system can perform an action based on a response to the notification from the user. For example, the system can provide a notification to the user upon unlocking a room door and entering the room that the user is ten minutes late for a dinner appointment. The system can take advantage of a location-based service such as GPS to confirm that the user is inside the hotel room. The system can suggest postponing the dinner appointment for thirty minutes to allow the user time to get to the restaurant. The user can use the app to respond to the notification such as confirming the dinner appointment postponement. Then, the app would postpone the dinner reservation automatically. In another example, a user can specify a time frame each day via the app, when his hotel room is available for cleaning to avoid room cleaning at inconvenient times. The user can specify a time frame during which he will be participating in the conference and will not need access to his room. In another example, a user can grant permission for a second user to temporarily access the user's room for a specific time frame using the app. In this example, a second user can be granted permission to enter a user's room to retrieve a forgotten item, such as car keys, because the second user was going to his own hotel room located adjacent to the user's room, to retrieve an item as well. Users can utilize social networking to grant temporary permission to one or more friends to unlock a door.

The concept of door unlocking using a payment account is not limited to room doors at a hotel or business, but can be applied to other areas such as unlocking a car door or unlocking a safe, for example. The concept involves utilizing a payment account associated with a user and then utilizing a card or another token associated with the payment account to unlock a lock. Instead of carrying specific keys or key cards for specific and separate locks, a card associated with a payment account that is often used can be used to unlock one or more locks protecting various things. For example, a credit card associated with a payment account and a user can be used to not only unlock a hotel room door while on travel as well as for making purchases, but could be used to start a rental vehicle while on travel and additionally could be used to open a locked safe in the user's hotel room. In addition to using a card associated with a payment account while traveling, it is possible to use a card associated with a payment account while at home or work to open a locked house door or start a leased car on a regular basis. A payment account could be used to authenticate a user in a computer system, such as during the log-in process. In addition to using a token associated with a payment account to open a lock, a user can use a combination of methods to open a lock such as using the payment account and a biometric such as an iris scanner or fingerprint scanner to verify identity. Optionally, a payment account with a password combination is feasible to unlock a lock. Any combination of methods to unlock a lock including utilizing a payment account associated with a user is possible.

Various embodiments of the disclosure are described in detail below. While specific implementations are described, it should be understood that this is done for illustration purposes only. Other components and configurations may be used without parting from the spirit and scope of the disclosure.

The present disclosure addresses door unlocking using a payment account. A system, method and computer-readable media are disclosed which unlock a door using a payment account. A brief introductory description of a basic general purpose system or computing device in FIG. 1 which can be employed to practice the concepts is disclosed herein. A more detailed description of door unlocking using a payment account will then follow. These variations shall be described herein as the various embodiments are set forth. The disclosure now turns to FIG. 1.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache 122 of high speed memory connected directly with, in close proximity to, or integrated as part of the processor 120. The system 100 copies data from the memory 130 and/or the storage device 160 to the cache 122 for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer-readable storage media provide nonvolatile storage of computer-readable instructions, data structures, program modules and other data for the computing device 100. In one aspect, a hardware module that performs a particular function includes the software component stored in a tangible computer-readable storage medium in connection with the necessary hardware components, such as the processor 120, bus 110, display 170, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the device 100 is a small, handheld computing device, a desktop computer, or a computer server.

Although the exemplary embodiment described herein employs the hard disk 160, other types of computer-readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations described below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited tangible computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored in other computer-readable memory locations.

Figure 2:
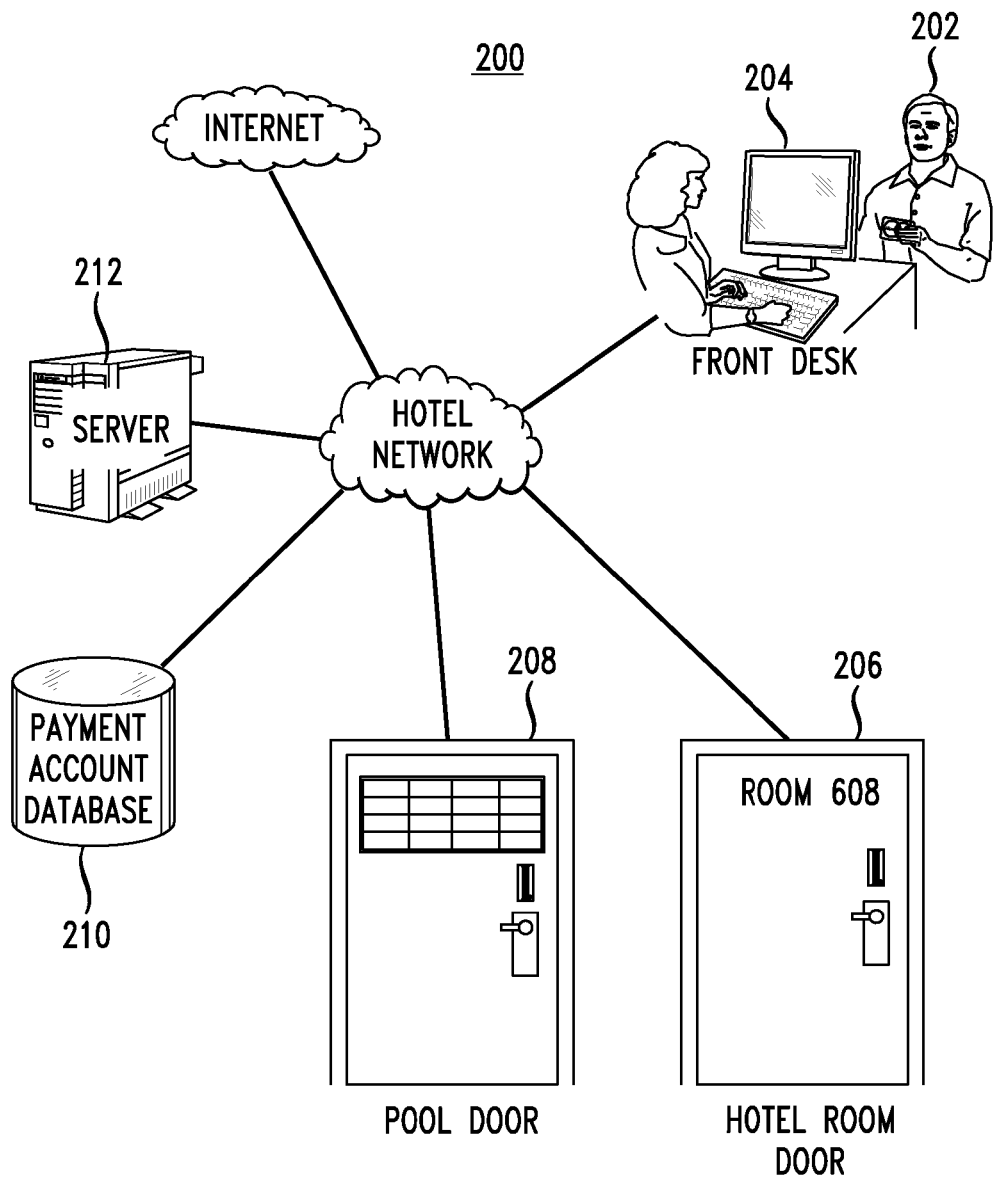
FIG. 2 illustrates an example hotel network system embodiment.

Having disclosed some components of a computing system, the disclosure now turns to FIG. 2, which illustrates a basic hotel network system. The system 200 includes a user 202, the hotel front desk 204, a typical hotel room door 206, a door leading to an indoor pool at the hotel 208, a payment account database 210 and a network server 212. The system 200 is used during all aspects of the door unlocking process, including the registration process of a user 202 at a front desk 204 of a hotel. During the registration process, the system 200 receives identification of a payment account associated with the user, such as a VISA credit account and establishes a policy such that the payment account is used as a key to unlock a room door at the hotel. The payment account can be one of a bank account, a credit card account and an online payment account such as PayPal, Amazon and Apple Pay, for example. The server 212 can transmit the payment account information and the policy to the payment account database for storage 210. The VISA credit account can be used to pay for the hotel room. Additionally, the policy can determine a group of payment accounts that are allowed to unlock the room door. The group of payment accounts can be associated with at least one user. For example, the user may choose to register the VISA credit account, his driver's license and a bank account as payment accounts that can unlock his hotel room door. At the hotel room door 206, the user 202 swipes a VISA card associated with the VISA payment account through a door mechanism, such as a card reader, to gain entry into his hotel room. The bank account can be associated with two other members of his family, such as his wife and son, and these additional users can use the registered payment accounts to unlock the room door. For example, the wife and son can use a debit card associated with the bank account and the user can use any of the cards he registered to unlock the door. Allowing for more than one card to unlock a hotel room door enables users to avoid the hassle and discomfort of carrying and using separate, dedicated key cards.

In addition to unlocking a standard hotel room door, a policy can grant permission for one or more payment accounts to unlock other doors at the hotel. Such doors can include a fitness center, laundry room, hospitality room, conference room and outer hotel doors after regular business hours, for example. In one aspect, the policy can assign time frames for unlocking room doors at the hotel. For example, the policy can allow a user to use the indoor pool during regular pool hours, and can allow the user to unlock a conference room door only when the conference is in session to allow limited access to particular rooms in the hotel that a user has access to. In another example, the policy can allow a user to unlock a party room used for a birthday party for several hours before the event to several hours after the event to allow for preparation and clean-up of the party in the room.

Figure 3:
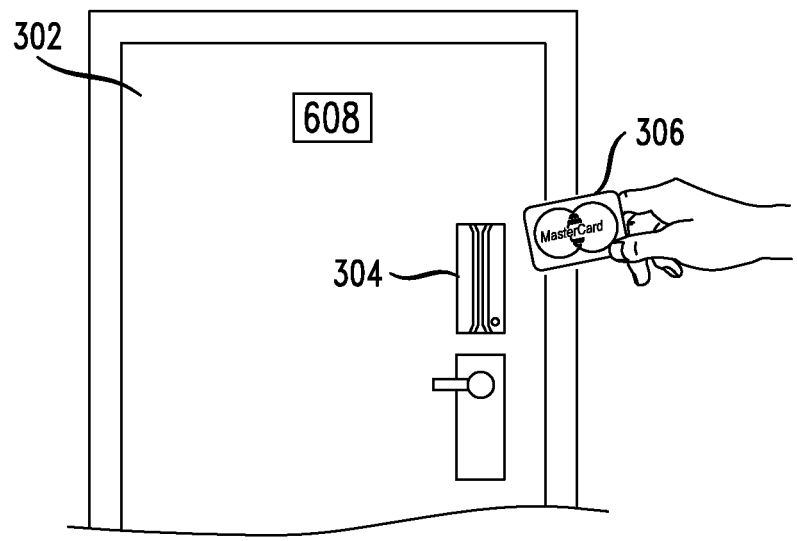
FIG. 3 illustrates a door mechanism for receiving payment account information.

FIG. 3 illustrates a hotel room door 302 with a door mechanism 304, such as a card reader, for receiving payment account information. The door mechanism 304 can transmit, to a server 212, payment account data associated with a card 306 swipe at the door 302. The server 212 can receive the payment account data associated with the card 306 swipe at the door 302 and can validate the payment account data using the payment account database 210. The server can query the payment account database using SQL or another database language for payment accounts that have access to the hotel room door 302. The following exemplary SQL statement selects the "CustomerName", "RoomNumber" and "PaymentAccount" columns from a "Customer" table in the database populated by the server during the registration process of hotel guests:

SELECT CustomerName, RoomNumber, PaymentAccount FROM Customers;

The database returns the names of customers, their room numbers and payment account information registered with the hotel to unlock their room doors. The server 212 can validate the payment account data by comparing the payment account data received from the door mechanism with the payment account information returned from the database query. The server 212 can transmit to the door mechanism 304 validation of the payment account data. The door mechanism 304 can receive, from the server 212, validation of the payment account data and can unlock the door 302 based on the validation. If the server 212 does not validate the payment account data, the system does not unlock the door 302. The door mechanism 304 can indicate to the user that the payment account information used for the door unlock attempt is invalid by flashing a red light or by sounding a buzzer, for example.

Figure 4:
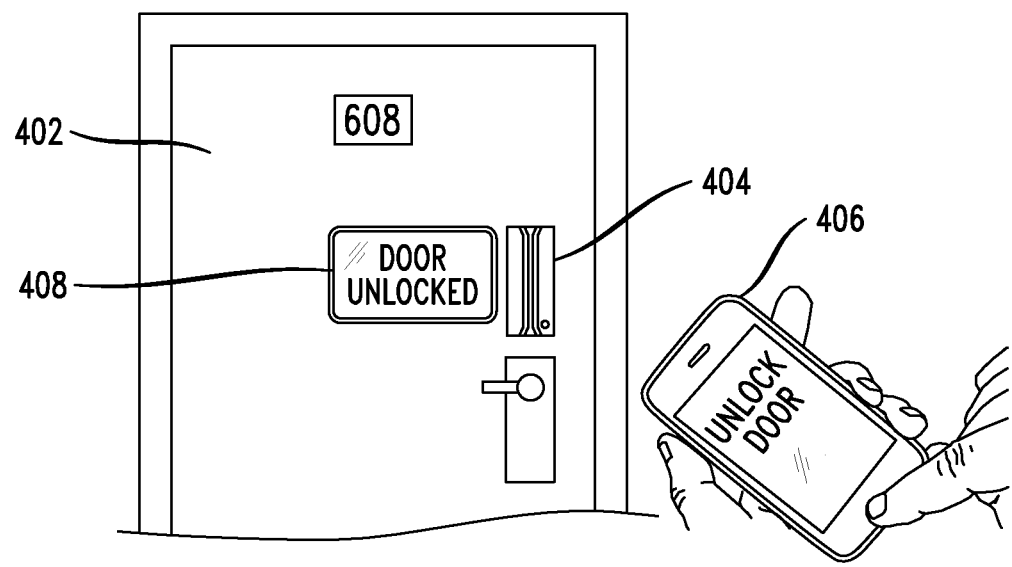
FIG. 4 illustrates a touch screen for receiving payment account information.

FIG. 4 illustrates a hotel room door 402 having a door mechanism 404 capable of wireless communication with a device 406 controlled by the user or with the server 212, for example. An application downloaded to the device 406 can be associated with the policy and can enable a user to issue an "UNLOCK DOOR" command to the door mechanism 404 along with payment account information. The system can store payment account information on the device 406 or the user can choose to enter in payment account information each time he wants to enter his hotel room 402. The door mechanism 404 can then wirelessly transmit the payment account information and the door number to the server 212 for validation. Upon validation by the server, the door mechanism can unlock the door 402. In one aspect, the system 200 can use a location-based service such as GPS to determine the location of the user 202. The policy can specify unlocking a hotel room door associated with a user and a payment account only when the user 202 is within a certain proximity of the room door such as 200 feet, for example. In one aspect, the door 402 can include a touch screen 408 or other interactive device in combination with a card reader, for example to wirelessly communicate with the user's device 406 and the server 212. The digital screen 408 can provide notifications to the user such as "DOOR LOCKED", "VALIDATING PAYMENT ACCOUNT", "VALIDATION COMPLETE", "ACCESS GRANTED or DOOR IS UNLOCKED", for example. The screen 408 can provide an additional layer of security if a user desires for an additional fee, for example. The additional layer of security could include entering a password or a biometric such as a fingerprint in addition to providing payment account information to unlock a door. A user needing a security detail such as a visiting foreign dignitary or official church leaders could desire a two-fold approach to securing their hotel room door or other doors they have access to, for example. Either the touch screen 408 on the door or the application on the device 406 could accept passwords and biometric inputs for an added layer of security.

Figure 5:
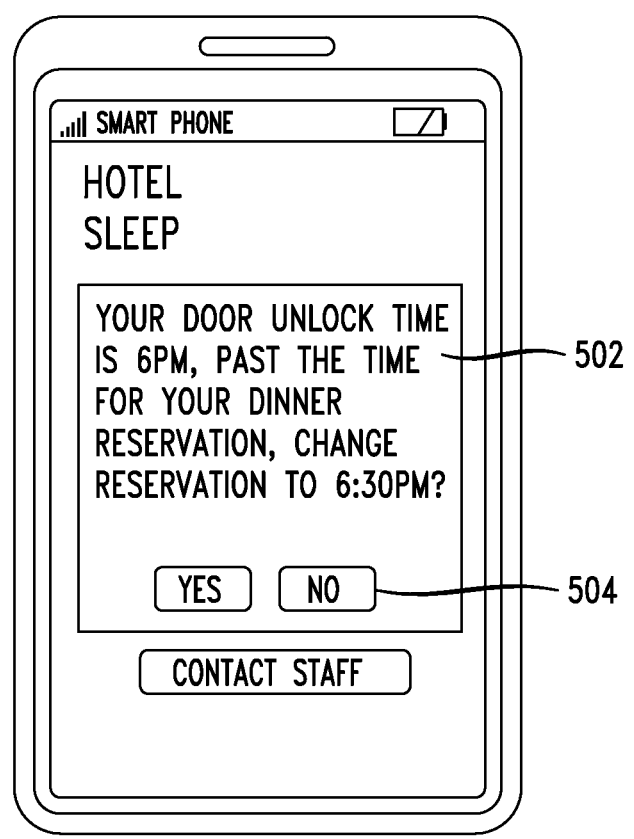
FIG. 5 illustrates a device screenshot of a hotel application.

Additionally, the system 200 can use a location-based service such as GPS to provide, via the application, a notification to the user based on a time of unlocking a door at the hotel. Then, the system 200 can perform an action based on a response to the notification from the user. FIG. 5 illustrates a device screenshot of a hotel application. For example, a user can make a dinner reservation for 5:30 PM at a local restaurant and can schedule the event on his calendar stored on his wireless device, such as a smartphone. When the user unlocks his hotel room door at 6:10 PM, the application can note the time and can confirm via GPS that the user is in the hotel room. Then the application can provide a notification 502 to the user based on the time of unlocking the door and verification of his location. The notification can inform the user that he is late for his dinner reservation and can prompt the user to indicate 504 whether or not the application should postpone the dinner reservation until 6:30 PM. If the user indicates a dinner postponement is desired, the application can postpone or cancel the appointment for the user. In another aspect, the system can use GPS and a door unlock event to verify a user's location. For example, a security detail could have access to entry and exit dates and times to and from a hotel room. This way, the security detail could verify that the user they are protecting is actually inside the hotel room, or exiting the hotel room for example. The application could provide notices to the detail upon unlocking a hotel room door.

The application downloaded to a mobile device can perform other actions, including scheduling cleaning services, remotely unlocking a hotel room door and granting permission for a second user to access a room at the hotel for a specific time frame. The application can determine using a calendar application and the hotel cleaning schedule an appropriate time for cleaning a user's hotel room so as to not inconvenience the user. For example, if a user is at the hotel for a conference, the application can schedule a time to clean the user's room when the conference is in session and the attendees are not taking a break. This way, the user is not inconvenienced by room cleaning when he wants to access the room, even for a short time period during the conference breaks. The application can notify the user when the cleaning crew actually unlocks his hotel room door and can notify the user when the cleaning is finished so that the user knows when he can return to his room. In one example, the application can remotely unlock a hotel room door for another person to gain entry into his room. For example, a user attending a conference at the hotel forgets an item in his hotel room and his friend is returning to his own room nearby to fetch an item. The user can use a location-based service to determine when his friend is outside his room door, and can issue a door unlock command to allow his friend entry into his room to retrieve the forgotten item. This method does not give permission for the friend to open the hotel room door, but allows him to enter the room. Another aspect of the application allows a user to grant permission for a second user to access a room associated with the first user for a specific time frame. For example, the user can grant access for the second user to use his payment account registered with the hotel to open the first user's door for a specific time frame to fetch a forgotten item. A user attending a conference at the hotel can grant temporary permission for a friend to access his hotel room for the 15 minutes during a break, so the friend can retrieve a book left behind. Notifications from the application can be provided in different ways including text messaging, emails and voice-recorded messages, for example.

Figure 6:
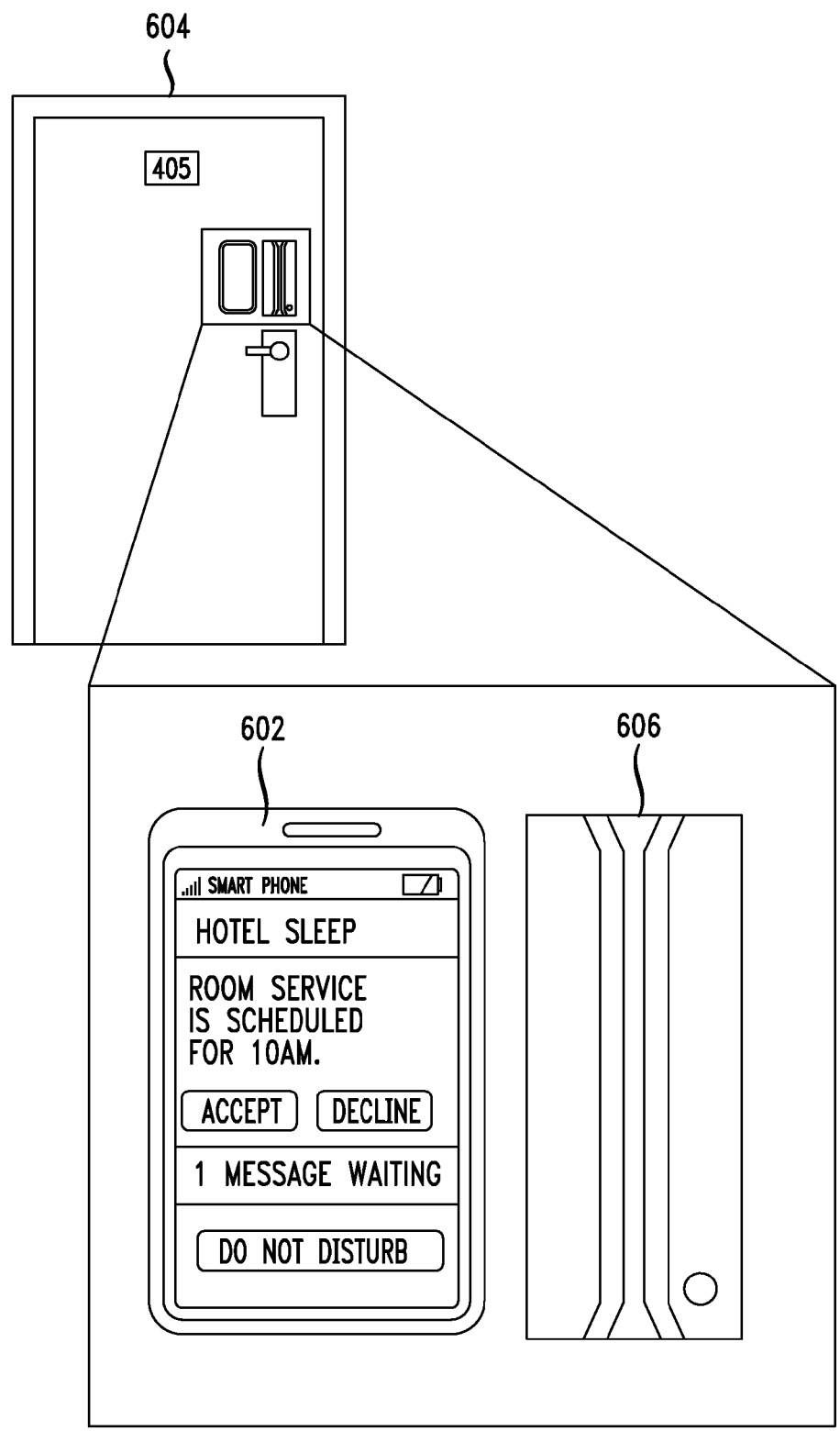
FIG. 6 illustrates a touch screen for receiving notices.

FIG. 6 illustrates a touch screen for receiving notices at a hotel door. The touch screen 602 at the hotel door 604 can provide notices to a user when the user unlocks the door. The notices would only be displayed on the touch screen after the door is unlocked so that other hotel customers would not see customer data in passing. The door unlocking can be accomplished remotely via a device or can be unlocked using a credit card or other registered card at the door via a card reader 606. Any of the methods described herein can be used to unlock the room door. Notices provided to the user via the touch screen 602 can include information such as a time of room cleaning or other related room data such as the check-out time for the day. Notices such as times breakfast will be served that day or a time when the gym is closed for cleaning can be provided. The user can interact with the system using the touch screen. For example, a notice about the time of a room cleaning can be provided to the user via the touch screen. The user can accept or decline the time of a scheduled room cleaning by touching a button on the screen. Alternately, the user can interact with the system via an application on a handheld device such as a smartphone. The user can view the notices on the touch screen and can use the device to respond to notices. Other information such as phone messages and time of a dinner reservation can be included on the touch screen. The touch screen can include icons for actions such as posting a "DO NOT DISTURB" message on the screen. Any information pertaining to the user and their stay at the hotel can be included on the touch screen.

In one example, the system can load credit card information to the computer controlling the touch screen at the door to ensure a user can open their room door even when a wireless connection is not available. For example, if the hotel wireless network goes down for any reason, the system has account information available at the room door so that a user can use a card associated with the account to unlock the room door. Other information such as time of room cleaning, time of checkout, messages waiting, etc. can also be transmitted to the computer at the door and stored there in case a wireless connection to a server is lost.

Figure 7:
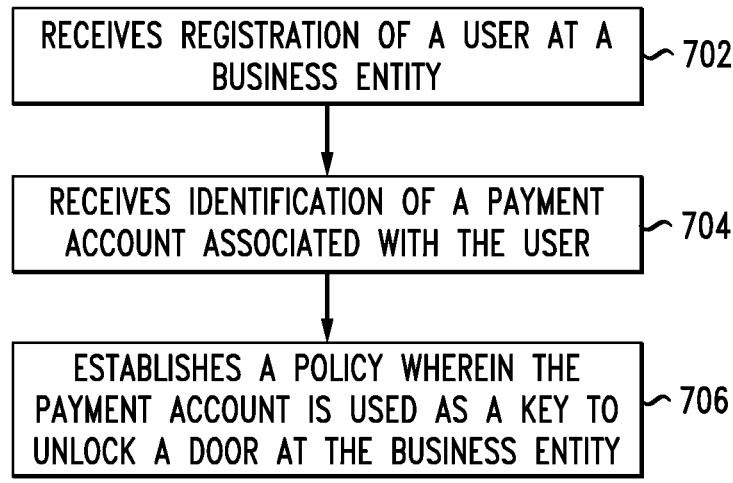
FIG. 7 illustrates an example method embodiment.

Having disclosed some basic system components and concepts, the disclosure now turns to the exemplary method embodiment shown in FIG. 7. For the sake of clarity, the method is described in terms of an exemplary system 100 as shown in FIG. 1 configured to practice the method. The steps outlined herein are exemplary and can be implemented in any combination thereof, including combinations that exclude, add, or modify certain steps.

FIG. 7 illustrates door unlocking using a payment account. A system 100 can receive registration of a user at a business entity (702) and can receive identification of a payment account associated with the user (704). Then the system can establish a policy wherein the payment account is used as a key to unlock a door at the business entity (706).

Figure 8:
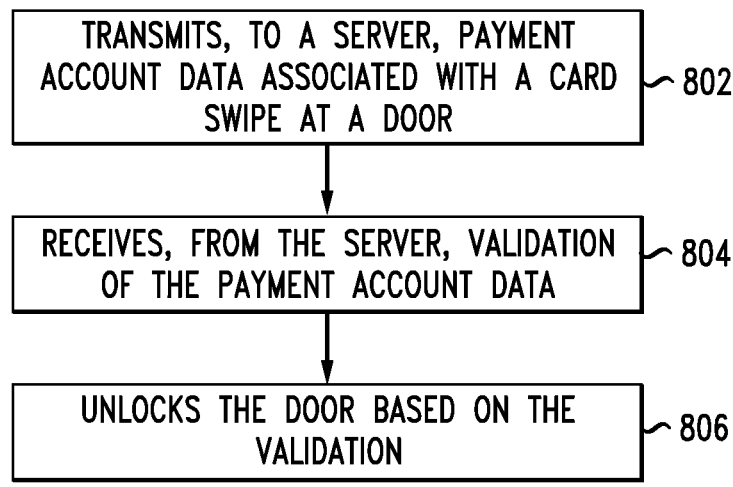
FIG. 8 illustrates an example method embodiment.

FIG. 8 illustrates door unlocking using a payment account at a door mechanism. The system 100 can transmit, to a server, payment account data associated with a card swipe at a door (802). The system can receive, from the server, validation of the payment account data (804) and can unlock the door based on the validation (806).

Figure 9:
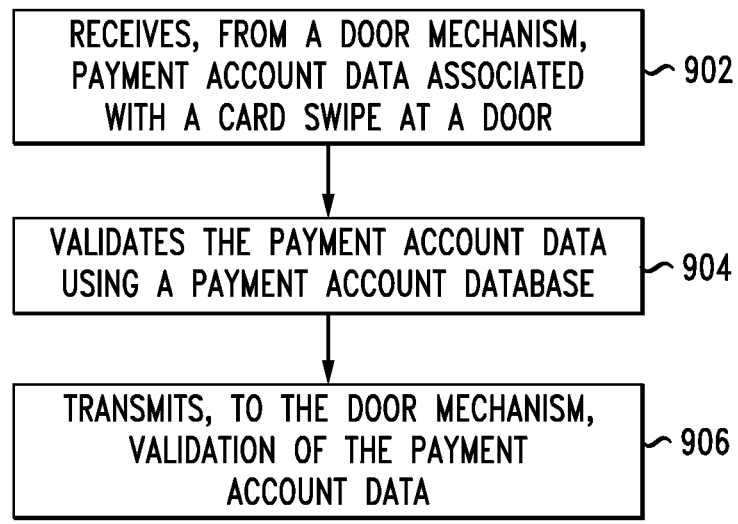
FIG. 9 illustrates an example method embodiment.

FIG. 9 illustrates door unlocking using a payment account at a server. The system can receive, from a door mechanism, payment account data associated with a card swipe at a door (902). The system can validate the payment account data using a payment account database (904) and can transmit, to the door mechanism, validation of the payment account data (906).

Embodiments within the scope of the present disclosure may also include tangible and/or non-transitory computer-readable storage media for carrying or having computer-executable instructions or data structures stored thereon. Such tangible computer-readable storage media can be any available media that can be accessed by a general purpose or special purpose computer, including the functional design of any special purpose processor as described above. By way of example, and not limitation, such tangible computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hard-wired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein apply to any process of unlocking a lock, not simply unlocking a hotel room door. Various modifications and changes may be made to the principles described herein without following the example embodiments and applications illustrated and described herein, and without departing from the spirit and scope of the disclosure.

I claim:

1. A method comprising:
    receiving, via a processor, a registration of a first user at a business entity, the first user using a first payment account to make a purchase at the business entity, wherein receiving the registration further comprises identifying a group of payment accounts comprising at least the first payment account of the first user and a second payment account of a second user;
    establishing, via the processor, a policy wherein the first payment account and the second payment account can each be used as a key to unlock a door at the business entity;
    receiving, via an electronic device having a communication interface at the door at the business entity, an indication of an interaction corresponding to the electronic device reading the first payment account or the second payment account respectively via the communication interface, the interaction used for identifying either the first payment account or the second payment account as the key to unlock the door at the business entity; and
    based on the interaction with the electronic device at the door, unlocking the door by the electronic device to permit access respectively to the first user or the second user.

2. The method of claim 1,
    wherein the electronic device at the door comprises a door unlocking mechanism that communicates with a database identifying that the first payment account and the second payment account or both authorized to unlock the door.

3. The method of claim 2, wherein receiving the indication comprises receiving a card swipe at the door using a card associated with either the first payment account or the second payment account respectively.

4. The method of claim 2, wherein receiving the indication comprises receiving, via a wireless communication, the interaction associated with either the first payment account or the second payment account at the door.

5. The method of claim 3, wherein the card is one of a credit card and an identification card.

6. The method of claim 1, wherein the business entity is a hotel.

7. The method of claim 1, wherein the first payment account and the second payment account are each one of a bank account, credit card account and online payment account.

8. The method of claim 7, wherein the online payment account is one of PayPal, Amazon and Apple Pay.

9. The method of claim 1, wherein the policy is associated with unlocking at least one of a hotel room door, a hospitality room door, a fitness center door and a pool door.

10. The method of claim 1, wherein the first payment account and the second payment account are each associated with at least one user.

11. The method of claim 1, wherein a location based service associates the first user with unlocking the door at the business entity.

12. The method of claim 1, wherein an application downloaded to a mobile device is associated with the policy.

13. The method of claim 12, the method further comprising:
    providing, via the application, a notification to the first user based on a time of unlocking a door at the business entity; and
    performing an action based on a response to the notification from the first user.

14. The method of claim 12, wherein the first user specifies a time frame via the application when a room at the business entity is available for cleaning.

15. The method of claim 12, wherein the first user remotely unlocks a room at the business entity via the application.

16. The method of claim 12, wherein the first user grants permission for the second user to access a room at the business entity for a specific time frame via the application.

17. The method of claim 1, wherein the first payment account is associated with a first physical card and the second payment account is associated with a second physical card.

18. The method of claim 17, wherein the first physical card and the second physical card, when used to make a purchase, both access the same banking account.

19. A system comprising:
    a processor; and
    a non-transitory computer-readable storage device storing instructions which, when executed by the processor, cause the processor to perform operations comprising:
        receiving a registration of a first user at a business entity, the first user using a first payment account to make a purchase at the business entity, wherein receiving the registration further comprises identifying a group of payment accounts comprising at least the first payment account of the first user and a second payment account of a second user;
        establishing a policy wherein the first payment account and the second payment account can each be used as a key to unlock a door at the business entity;
        receiving, via an electronic device having a communication interface at the door at the business entity, an indication of an interaction corresponding to the electronic device reading the first payment account or the second payment account respectively via the communication interface, the interaction used for identifying either the first payment account or the second payment account as the key to unlock the door at the business entity; and
        based on the interaction with the electronic device at the door, unlocking the door by the electronic device to permit access respectively to the first user or the second user.

20. A non-transitory computer-readable storage device storing instructions which, when executed by a processor, cause the processor to perform operations comprising:

receiving a registration of a first user at a business entity, the first user using a first payment account to make a purchase at the business entity, wherein receiving the registration further comprises identifying a group of payment accounts comprising at least the first payment account of the first user and a second payment account of a second user;

establishing a policy wherein the first payment account and the second payment account can each be used as a key to unlock a door at the business entity;

receiving, via an electronic device having a communication interface at the door at the business entity, an indication of an interaction corresponding to the electronic device reading the first payment account or the second payment account respectively via the communication interface, the interaction used for identifying either the first payment account or the second payment account as the key to unlock the door at the business entity; and based on the interaction with the electronic device at the door, unlocking the door by the electronic device to permit access respectively to the first user or the second user.

\* \* \* \* \*